Jan. 13, 1942.  C. W. HELLBERG  2,269,627
COOKING UTENSIL
Filed Jan. 22, 1940
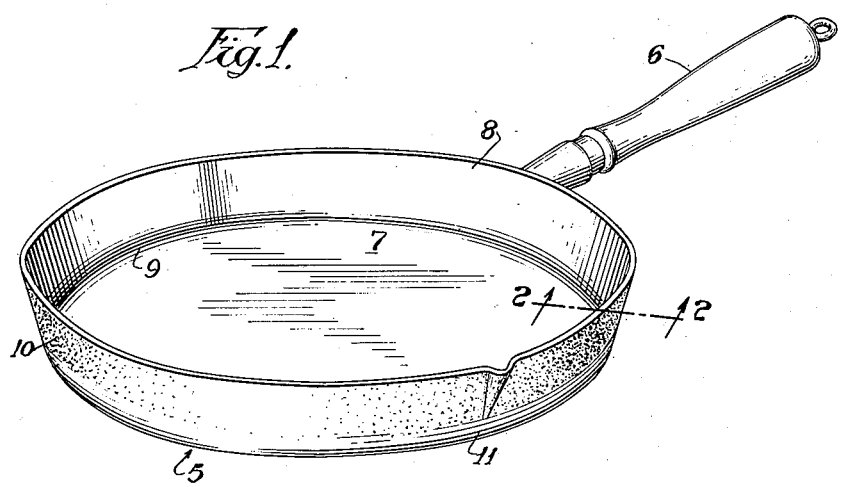
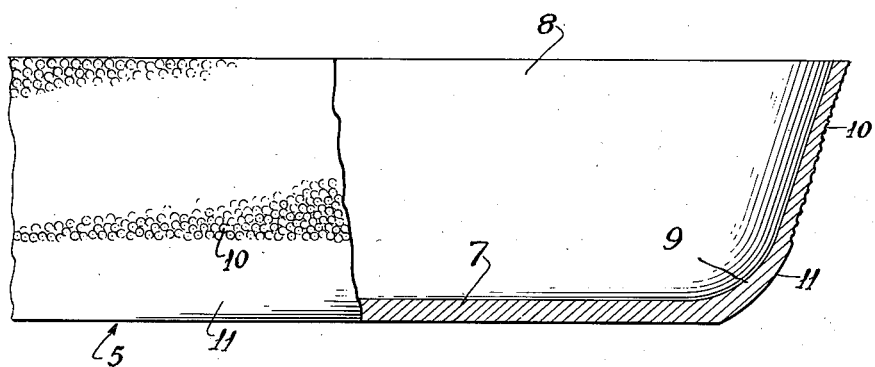
Witness:
E. Campouri
Inventor:
Carl W. Hellberg,
By: Arthur W. Thelen
Attorney.

Patented Jan. 13, 1942

2,269,627

UNITED STATES PATENT OFFICE 2,269,627

COOKING UTENSIL

Carl W. Hellberg, Chicago, Ill., assignor to Club Aluminum Products Company, Chicago, Ill., a corporation of Delaware Application January 22, 1940, Serial No. 314,927

4 Claims. (Cl. 53—7)

This invention relates to improvements in cooking utensils and it consists of the matters hereinafter described and more particularly pointed out in the appended claims.

The invention is more especially concerned with cooking utensils for use upon open burners and wherein a flame directly impinges against the bottom thereof.

It is frequently the practice to provide an ornamental external surface for the side wall of the utensil to enhance its appearance and thus increase its sales appeal. When they are made from one of the lighter metals such as aluminum, the practice is to peen the external surface of the side wall from the top to the bottom thereof.

When utensils of this kind are used upon an open flame burner such as a coal, gas or oil stove, the lower external portion of the side wall adjoining the bottom soon becomes blackened. The reason therefor is that combustion from burners of this kind is seldom entirely complete so that carbon and other unburned particles adhere to the depressions in the peened surface. This materially detracts from the appearance of the utensil, and makes the task of cleaning difficult and laborious.

One of the objects of the present invention is to provide a cooking utensil having a generally upright side wall, the upper portion of the external surface of which is ornamented and the lower portion of which surface is so made, not only to be more easily cleaned than the upper portion, but which more ably resists the deposition and accumulation of such products of combustion as tend to cling thereto.

Another object of the invention is to provide a metallic cooking utensil, the side wall of which presents a two-tone appearance effect formed by roughened and smooth surface portions with the smooth surface portions disposed at the bottom of the side wall.

A further object of the invention is to provide a cooking utensil of this kind wherein the upper portion of the side wall has a denser metal structure for a better retention of heat units applied thereto in use, so as to be more economical in this respect, but at the same time has a more pleasing appearance and may be more easily and thoroughly cleaned about that portion most apt to become soiled by reason of impingement of certain of the products of combustion from the burner, upon which the utensil is used.

The above mentioned objects of the invention, as well as the several advantages thereof will more fully appear as the specification proceeds.

In the drawing:

Fig. 1 is a perspective view of a cooking utensil such as a frying pan or skillet embodying the preferred form of the invention.

Fig. 2 is a fragmentary view, on an enlarged scale, partly in side elevation and partly in vertical section of a portion of the side wall and the bottom of the utensil appearing in Fig. 1, the section being taken on the line 2—2 of Fig. 1.

Referring now in detail to that embodiment of the invention illustrated in the drawing; 5 indicates as a whole the body or vessel of a cooking utensil and 6 indicates the handle therefor. As shown the utensil is a frying pan or skillet but this is by way of illustration and not by way of limitation. In this instance, also the body of the utensil is made of a cast metal such as aluminum and therefore, the walls thereof are relatively thick as compared to a spun or pressed sheet metal body.

The body comprises a relatively flat bottom 7 and an integral annular, generally upstanding side wall 8. The side wall 8, which flares upwardly and outwardly, is joined to the bottom by a rounded corner 9.

To make the utensil more pleasing in appearance, the external surface 10 of the major upper portion of the side wall is roughened with respect to the external surface 11 of minor lower portion of the side wall and the corner 9 as best shown in Fig. 2. Preferably the roughened external surfaces of the side wall is formed by peening the same in any approved manner. Such peening provides innumerable closely adjacent depression-like facets and renders the metal of the side wall, inwardly thereof, more dense than the metal present in the minor lower portion of the side wall and in the corner 9 and bottom 7 respectively. When the metal has been peened as mentioned, and its density is thus increased, it is considered by some that it retards dissipation of heat to surrounding atmosphere and is, therefore, more economical in the use of heat applied to the bottom of the pan when the utensil is placed over an open flame burner. According to this theory the major portion of the body being rough and only a minor portion being smooth the effectiveness of the utensil in this respect is not greatly affected.

A utensil of the construction described presents an attractive appearance after it has been polished as the peened-in depressions present innumerable facets for the reflection of light which harmonizes with the smooth surface band effect produced by the lower portion of the side wall and the corner by which it joins the bottom.

When such a utensil is placed upon an open flame burner, the flame impinges against the bottom of the utensil to impart heat thereto for cooking purposes. When the flame of the burner is on too "high," the flame is spread by the bottom to an area greater than that of the bottom so that the fringes of the flame lap around the corner 9 and part way up the external surface of the side wall. Under such conditions, and at other times, certain of the unburned products of combustion tend to deposit themselves upon the external surface of the corner 9 and the lower portion 11 of the side wall 8. However, as this surface is relatively smooth and highly polished, said products do not readily adhere thereto and such as do may be easily removed. Where the roughened portion extends to the bottom, as in prior constructions, the unburned products more readily adhere to the external wall portion and such products as do adhere are difficult of removal.

While in describing the invention I have referred in detail to the form of surface portion, as well as the arrangement thereof on the utensil, the same is to be considered only in the illustrative sense so that I do not wish to be limited thereto except as may be specifically set forth in the appended claims.

I claim as my invention:

1. A metallic cooking utensil including a bottom and an upstanding side wall, the upper portion of said side wall having a denser structure than the lower portion which joins the bottom, the upper portion having a relatively rough external surface, the external surface of said lower portion being relatively smooth.

2. A metallic cooking utensil including a bottom and an upstanding side wall, the upper portion of said side wall having a denser structure than its lower portion which joins the bottom by a corner, the upper portion having a relatively rough external surface, the external surface of said lower portion and said corner being relatively smooth.

3. A metallic cooking utensil including a bottom and an upstanding side wall, the upper portion of said side wall having a peened external surface and the lower portion of the side wall adjacent the bottom having a smooth external surface.

4. A metallic cooking utensil including a bottom and an upstanding side wall joined thereto by a corner, the upper portion of said side wall having a peened external surface and having a density greater than that of the lower portion and said corner and which lower portion and said corner have a smooth external surface.

CARL W. HELLBERG.